(12) United States Patent
Tanoue et al.

(10) Patent No.: US 10,884,009 B2
(45) Date of Patent: Jan. 5, 2021

(54) AUTOMATED ANALYZER

(71) Applicant: Hitachi High-Tech Corporation, Tokyo (JP)

(72) Inventors: Hidetsugu Tanoue, Tokyo (JP); Yoichiro Suzuki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 112 days.

(21) Appl. No.: 16/086,699

(22) PCT Filed: Jan. 24, 2017

(86) PCT No.: PCT/JP2017/002306
§ 371 (c)(1),
(2) Date: Sep. 20, 2018

(87) PCT Pub. No.: WO2017/163582
PCT Pub. Date: Sep. 28, 2017

(65) Prior Publication Data
US 2019/0107549 A1 Apr. 11, 2019

(30) Foreign Application Priority Data
Mar. 24, 2016 (JP) .................. 2016-060068

(51) Int. Cl.
*G01N 35/10* (2006.01)
*G01F 23/26* (2006.01)

(52) U.S. Cl.
CPC ......... *G01N 35/1009* (2013.01); *G01F 23/26* (2013.01); *G01N 35/10* (2013.01);
(Continued)

(58) Field of Classification Search
CPC ............... G01N 35/1009; G01N 35/10; G01N 35/1002; G01N 35/1065; G01N 2035/1025; G01F 23/26
(Continued)

(56) References Cited

U.S. PATENT DOCUMENTS

2007/0144253 A1* 6/2007 Kobayashi ............. G01F 23/28
73/304 C
2007/0166194 A1 7/2007 Wakatake
(Continued)

FOREIGN PATENT DOCUMENTS

JP 8-122126 A 5/1996
JP 2007-322286 A 12/2007
(Continued)

OTHER PUBLICATIONS

International Search Report (PCT/ISA/210) issued in PCT Application No. PCT/JP2017/002306 dated Mar. 28, 2017 with English translation (four (4) pages).
(Continued)

*Primary Examiner* — Robert R Raevis
(74) *Attorney, Agent, or Firm* — Crowell & Moring LLP (57) ABSTRACT

In preparation for a case in which the time at which a first reagent probe comes into contact with cleaning liquid and the time at which a second reagent probe comes into contact with cleaning liquid are the same, an automated analyzer is provided with a charge accumulation unit that is provided between a supply port comprising a conductive material that is electrically connected to the cleaning liquids and a device housing and has a capacitance that is greater than or equal to that of the first reagent probe and second reagent probe. As a result, it is possible to prevent interference between the liquid-surface contact determination units of a plurality of probes.

6 Claims, 5 Drawing Sheets

(52) U.S. Cl.
CPC ..... *G01N 35/1002* (2013.01); *G01N 35/1065* (2013.01); *G01N 2035/1025* (2013.01)

(58) Field of Classification Search
USPC .... 422/63, 64, 509, 510; 73/864.83, 864.81, 73/864.24–864.25, 304 C; 324/663, 665, 324/685, 690
See application file for complete search history.

(56) References Cited

U.S. PATENT DOCUMENTS

| | | |
|---|---|---|
| 2008/0286158 A1 | 11/2008 | Watanabe et al. |
| 2011/0102004 A1 | 5/2011 | Schoni |
| 2014/0037503 A1 | 2/2014 | Sakashita et al. |
| 2014/0152326 A1 | 6/2014 | Zuppiger |

FOREIGN PATENT DOCUMENTS

| | | |
|---|---|---|
| JP | 2008-309777 A | 12/2008 |
| JP | 2016-14578 A | 1/2016 |
| WO | WO 2012/105398 A1 | 8/2012 |

OTHER PUBLICATIONS

Japanese-language Written Opinion (PCT/ISA/237) issued in PCT Application No. PCT/JP2017/002306 dated Mar. 28, 2017 (three (3) pages).

International Preliminary Report on Patentability (PCT/IB/338 & PCT/IB/373) issued in PCT Application No. PCT/JP2017/002306 dated Sep. 25, 2018, including English translation of document C2 (Japanese-language Written Opinion (PCT/ISA/237) previously filed on Sep. 20, 2018) (seven (7) pages).

Extended European Search Report issued in counterpart European Application No. 17769629.1 dated Oct. 21, 2019 (eight (8) pages).

* cited by examiner

AUTOMATED ANALYZER

TECHNICAL FIELD

The present invention relates to an automated analyzer for performing the qualitative and quantitative analysis of biological samples such as blood and urine.

BACKGROUND ART

In order to accurately detect a liquid surface of the liquid sample based on the change in capacitance between the probe and the liquid sample by checking a change in capacitance due to an environment around a holding mechanism of a liquid container or the container itself when a probe is inserted during a dispensing operation, and a change in capacitance between the probe and a liquid sample, PTL 1 discloses a device for detecting a liquid surface. This device includes a probe for collecting liquid from the liquid container by a sampler and an arm for holding the probe, detects a change in capacitance between the probe and the liquid as the probe is inserted into the liquid container, and detects the liquid surface of the liquid based on the detected result.

CITATION LIST

Patent Literature

PTL 1: JP-A-8-122126

SUMMARY OF INVENTION

Technical Problem

There is an automated analyzer that measures a concentration by adding a reagent to a sample and causing a biochemical reaction when performing qualitative/quantitative analysis of a target component in the biological sample such as blood or urine. This automated analyzer is widely used in large hospitals, inspection centers, etc. because it may improve the reproducibility of measurement results and speed up measurement. As one of the reasons, the automated analyzer has a dispensing mechanism capable of automatically dispensing samples and reagents required for biochemical reactions and antigen-antibody reactions with high accuracy and with rapidity.

Here, in the case of capturing liquid such as reagents, samples or cleaning reagents, if a variation between outer and inner walls of the probe occurs, there is a probability of being entrained into a container to be dispensed or a next sample container. Such entrainment leads to the insufficient cleaning of the outer wall of the probe, and an increase in variation in analysis reproducibility or an increase in cross-contamination between samples.

Therefore, in order to reduce the adhesion of the reagent and the like to the outer and inner walls of the probe, there are known a method in which the liquid surface is detected by a sensor and the insertion amount of the reagent or sample to the probe is controlled to perform dispensing with high accuracy and rapidity, and a method of efficiently cleaning the inner and outer walls of the probe.

As an example of the sensor for detecting the liquid surface, the above-mentioned PTL 1 describes a capacitance-type sensor that detects the liquid surface in the container due to a change in capacitance between electrodes, when the dispensing probe is used as an electrode for detecting the liquid surface and the other electrode is used as a container support base.

In order to clean the inner and outer walls of the probe, a plurality of cleaning tanks is provided in the automated analyzer. For example, there is an automated analyzer having a cleaning-liquid supply port for cleaning the probe.

This automated analyzer determines whether a leading end of the probe comes into contact with the cleaning liquid, using a liquid-surface detection sensor, thus determining whether reliable cleaning is performed and thereby improving the reliability of the analyzed result.

Here, the plurality of probes may be simultaneously brought into contact with the cleaning liquid of the cleaning-liquid supply port, for the purpose of highly accurate and rapid dispensing. In this case, it is conceived that the probes are electrically connected directly with each other in the conductive cleaning liquid and interference between capacitance detectors occurs. Even when the plurality of probes is brought into contact with cleaning liquid of different cleaning-liquid supply ports, the probes are electrically connected directly with each other through a pipe for transporting the cleaning liquid to the cleaning-liquid supply port and cleaning liquid discarded into the cleaning tank from the cleaning-liquid supply port, thus causing interference between the capacitance detectors.

When this interference occurs, it becomes impossible to determine whether the leading end of the probe is in contact with the liquid surface. Thus, in order to perform reliable cleaning, it is found that it is more important to prevent interference.

An object of the present invention is to provide an automated analyzer capable of preventing interference between liquid-surface contact determination units of a plurality of probes.

Solution to Problem

In order to accomplish the above object, the configuration described in claims for example is employed. The present invention includes a plurality of means for solving the above problems. For example, the invention provides an automated analyzer dispensing and causing a sample and a reagent to react with each other in a reaction container to measure a reacted mixed solution, the automated analyzer including a plurality of dispensing probes dispensing a reagent or a sample to be analyzed into the reaction container, a supply port storing conductive liquid with which the dispensing probe comes into contact, a conductive-liquid supply unit supplying the conductive liquid, through a flow path connected to the supply port, to the supply port, a liquid-surface contact determination unit installed in each of the plurality of dispensing probes, and determining a contact of a leading end of the dispensing probe with a liquid surface of the conductive liquid, based on a change in capacitance between the leading end and a housing, and a charge accumulation unit provided between the conductive liquid and the housing, and having a capacitance that is equal to or higher than a capacitance of the dispensing probe.

Advantageous Effects of Invention

According to the present invention, it is possible to prevent interference between liquid-surface contact determination units of a plurality of probes. The objects, configurations and effects other than those mentioned above will be clarified by the description of the following embodiments.

DESCRIPTION OF EMBODIMENTS

Hereinafter, an automated analyzer according to an embodiment of the present invention will be described with reference to the accompanying drawings.

First Embodiment

Figure 1:
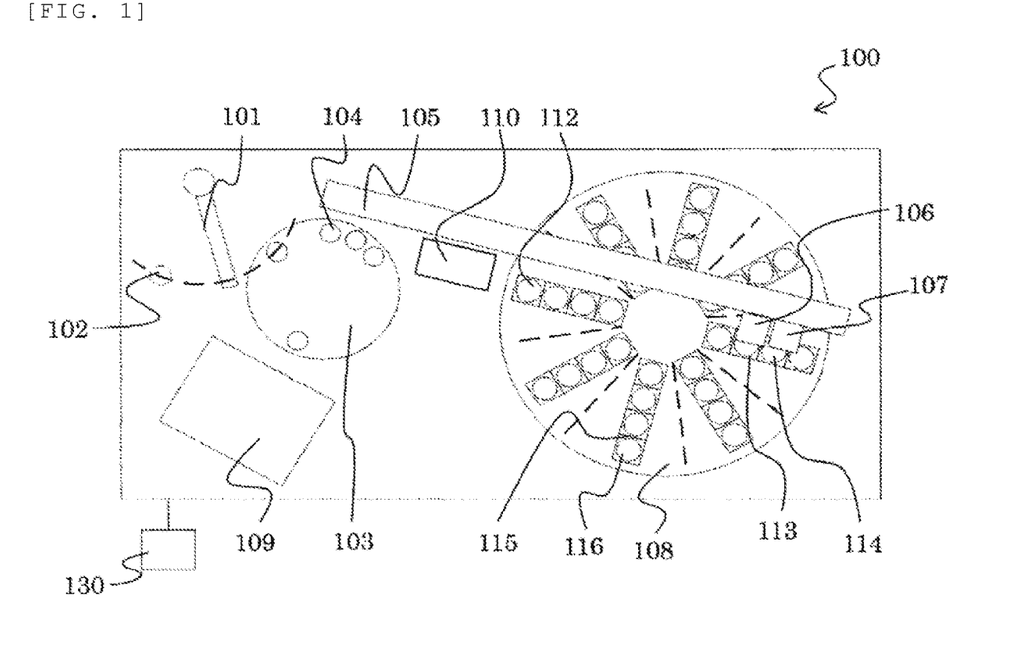
FIG. 1 is a schematic view illustrating a configuration of an automated analyzer according to a first embodiment of the present invention.
Figure 2:
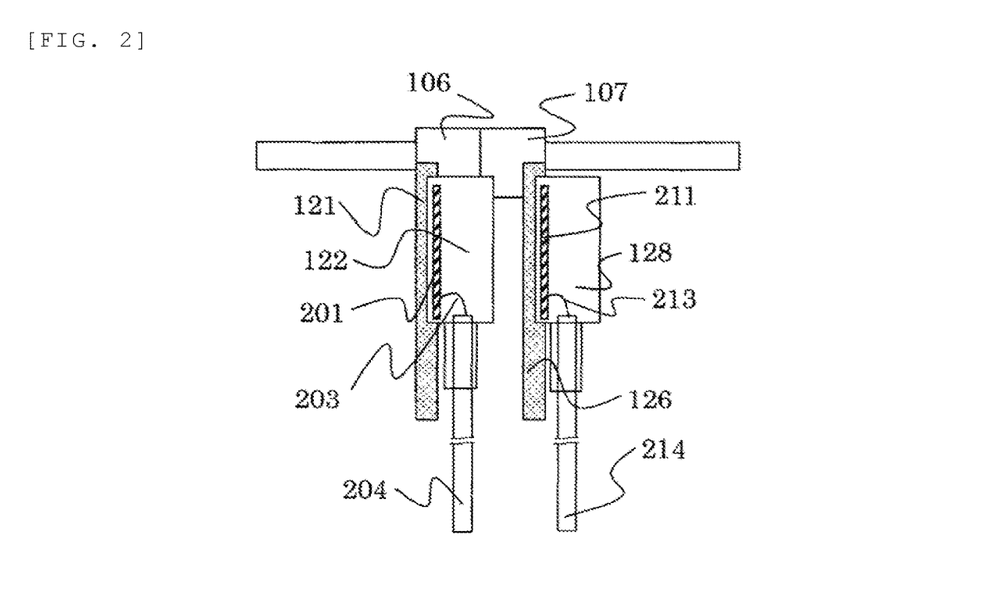
FIG. 2 is a schematic view illustrating an example of a configuration of a dispensing probe in the automated analyzer according to the first embodiment.

A first embodiment of an automated analyzer of the present invention will be described with reference to FIGS. 1 to 4. First, the automated analyzer will be outlined with reference to FIGS. 1 and 2. FIG. 1 is a view illustrating a structure of the automated analyzer according to this embodiment, and FIG. 2 is a view illustrating a configuration of a dispensing probe.

An automated analyzer 100 is a device that dispenses and causes a sample and a reagent to react with each other in a reaction container 104 to measure a reacted mixed solution. As illustrated in FIG. 1, this analyzer includes a sample probe 101, a reaction disk 103, an x-moving-mechanism holding part 105, a first x-direction moving mechanism 106, a second x-direction moving mechanism 107, a reagent disk 108, a detector 109, a cleaning tank 110, a controller 130, and the like.

The reaction containers 104 are circumferentially arranged in the reaction disk 103. Each reaction container 104 is a container for containing a mixed solution produced by mixing the sample 102 with the reagent. A plurality thereof is arranged on the reaction disk 103.

The sample probe 101 that is rotatable and movable vertically is located between the reaction disk 103 and the sample 102. The sample probe 101 sucks the sample 102 and dispenses the sample into the reaction container 104 on the reaction disk 103. Although only one sample probe 101 is shown in the drawing, a plurality of sample probes 101 may be formed.

The reagent disk 108 is a storage cabinet on which a plurality of reagent bottles 112 containing reagents therein, first reagent bottles 113, second reagent bottles 114, third reagent bottles 115, and fourth reagent bottles 116 are circumferentially placed. The reagent disk 108 is kept cool.

A first reagent probe 204 and a second reagent probe 214 are provided between the reaction disk 103 and the reagent disk 108 to be horizontally rotatable and vertically movable, and function to dispense the reagent from the reagent bottle 112 to the reaction container 104, as illustrated in FIG. 2.

As illustrated in FIG. 2, the first reagent probe 204 is held by a first-reagent-probe holding part 122, and is movable down by a first z-direction moving mechanism 121. The second reagent probe 214 is held by a second-reagent-probe holding part 128, and is movable down by a second z-direction moving mechanism 126.

The first z-direction moving mechanism 121 is moved by the first x-direction moving mechanism 106 on the x-moving-mechanism holding part 105, and the second z-direction moving mechanism 126 is moved by the second x-direction moving mechanism 107 on the x-moving-mechanism holding part 105. They may be movable between the reaction disk 103 and the reagent bottle 112 located at any point by the rotating reagent disk 108.

A first liquid-surface contact determination unit 201 is held on the first-reagent-probe holding part 122 to be electrically connected to the first reagent probe 204 via a wiring 203. A second liquid-surface contact determination unit 211 is held on the second-reagent-probe holding part 128 to be electrically connected to the second reagent probe 214 via a wiring 213.

The first liquid-surface contact determination unit 201 determines contact between a leading end of the first reagent probe 204 and the reagent in the reagent bottle 112 or the like, based on a change in capacitance between the leading end of the first reagent probe and the housing of the automated analyzer. The second liquid-surface contact determination unit 211 determines contact between a leading end of the second reagent probe 214 and the reagent in the reagent bottle 112 or the like, based on a change in capacitance between the leading end of the second reagent probe and the housing of the automated analyzer.

The detector 109 is a unit for detecting a signal amount corresponding to the concentration of a target substance in the mixed solution which has reacted in the reaction container 104.

The controller 130 is constituted by a computer or the like to control the operation of each mechanism in the automated analyzer while performing arithmetic processing for obtaining the concentration of a predetermined component in the sample.

The above-described components are the general configuration of the automated analyzer 100.

The process of analyzing the sample 102 by the above-described automated analyzer 100 is generally performed in the following order.

First, the sample 102 near the reaction disk 103 is dispensed to the reaction container 104 on the reaction disk 103 by the sample probe 101.

Next, the reagent to be used for the analysis is dispensed to the reaction container 104 to which the sample 102 is first dispensed by the first reagent probe 204 and the second reagent probe 214 from the first reagent bottle 113 and the second reagent bottle 114 on the reagent disk 108.

More specifically, the first reagent probe 204 is moved above the first reagent bottle 113 and the second reagent bottle 114 by the first x-direction moving mechanism 106, and then is moved down by the first z-direction moving mechanism 121. Further, the second reagent probe 214 is moved above the first reagent bottle 113 and the second reagent bottle 114 by the second x-direction moving mechanism 107, and then is moved down by the second z-direction moving mechanism 126.

When the first reagent probe 204 comes into contact with the liquid surface of the reagent in the first reagent bottle 113 or the second reagent bottle 114 and the first liquid-surface contact determination unit 201 detects the liquid, the first z-direction moving mechanism 121 stops operating and sucks the reagent. When the second reagent probe 214 comes into contact with the liquid surface of the reagent in the first reagent bottle 113 or the second reagent bottle 114 and the second liquid-surface contact determination unit 211 detects the liquid, the second z-direction moving mechanism 126 stops operating and sucks the reagent.

After sucking the reagent, the first reagent probe 204 is moved up by the first z-direction moving mechanism 121, and then is moved above the reaction disk 103 by the first x-direction moving mechanism 106, thus discharging the reagent to the reaction container 104. The second reagent probe 214 is moved up by the second z-direction moving mechanism 126, and then is moved above the reaction disk 103 by the second x-direction moving mechanism 107, thus discharging the reagent to the reaction container 104.

Subsequently, the sample 102 and the reagent react with each other in the reaction container 104 for a certain period of time.

Thereafter, the detector 109 detects the signal amount corresponding to the concentration of the target substance in the mixed solution after the reaction, and the concentration of a predetermined component in the sample 102 is obtained by performing the arithmetic processing by the controller 130.

As described above, the plurality of reagent bottles 112 is installed in the reagent disk 108. Thus, in the automated analyzer 100, the reagent disk 108 is rotated under the tracks of the first x-direction moving mechanism 106 and the second x-direction moving mechanism 107 to move any reagent bottle 112. This allows the first reagent probe 204 and the second reagent probe 214 to suck the reagent from any reagent bottle 112.

In the case of sucking the reagent from the third reagent bottle 115 or the fourth reagent bottle 116 at the time of the analysis, or in the case of analyzing the next sample 102, the inside and outside of the first reagent probe 204 and the second reagent probe 214 are cleaned by washing away the previous reagent with distilled water in the cleaning tank 110, and then suction is performed.

Figure 3:
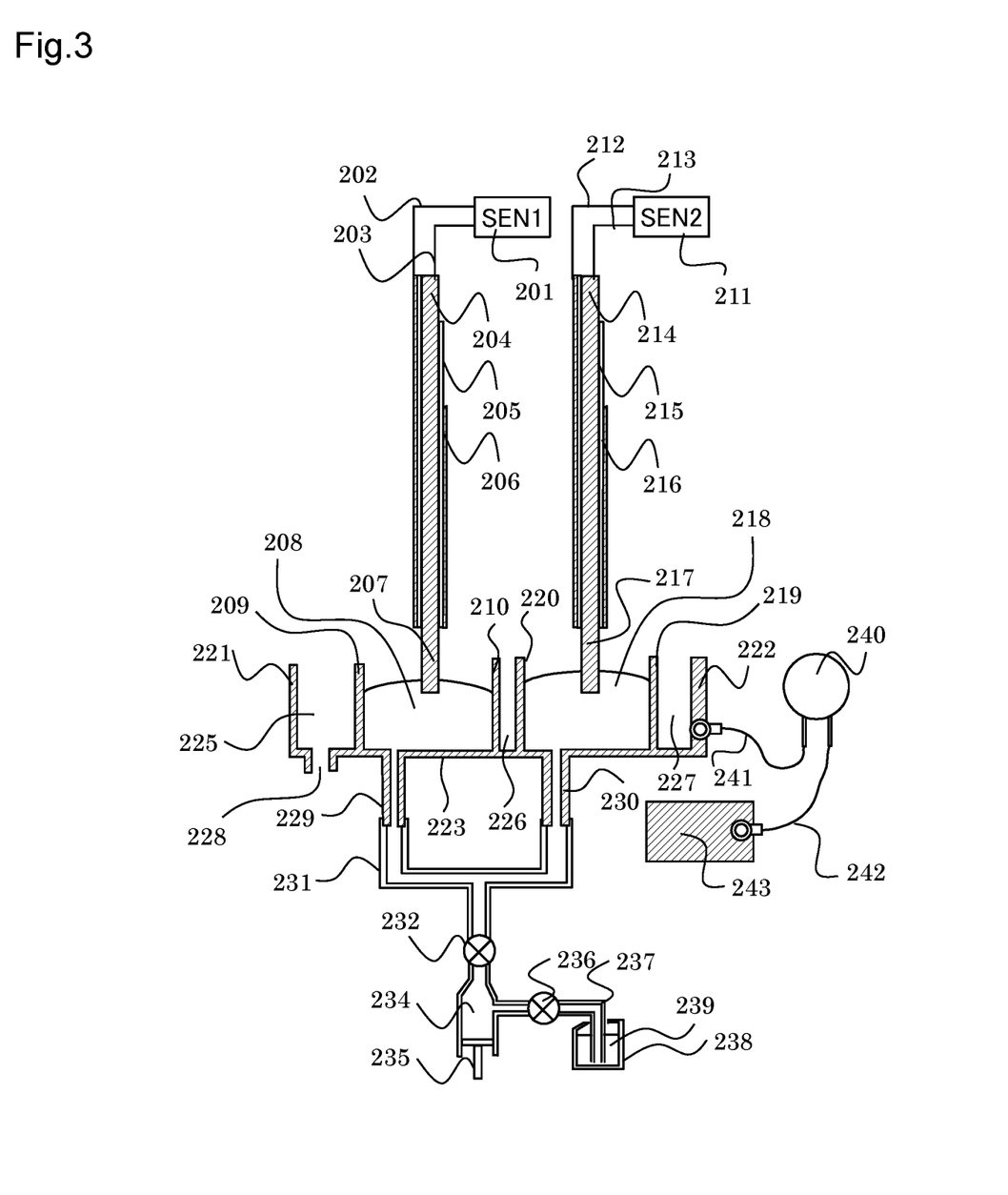
FIG. 3 is a schematic view illustrating a configuration of a member related to a cleaning tank in the automated analyzer according to the first embodiment.
Figure 4:
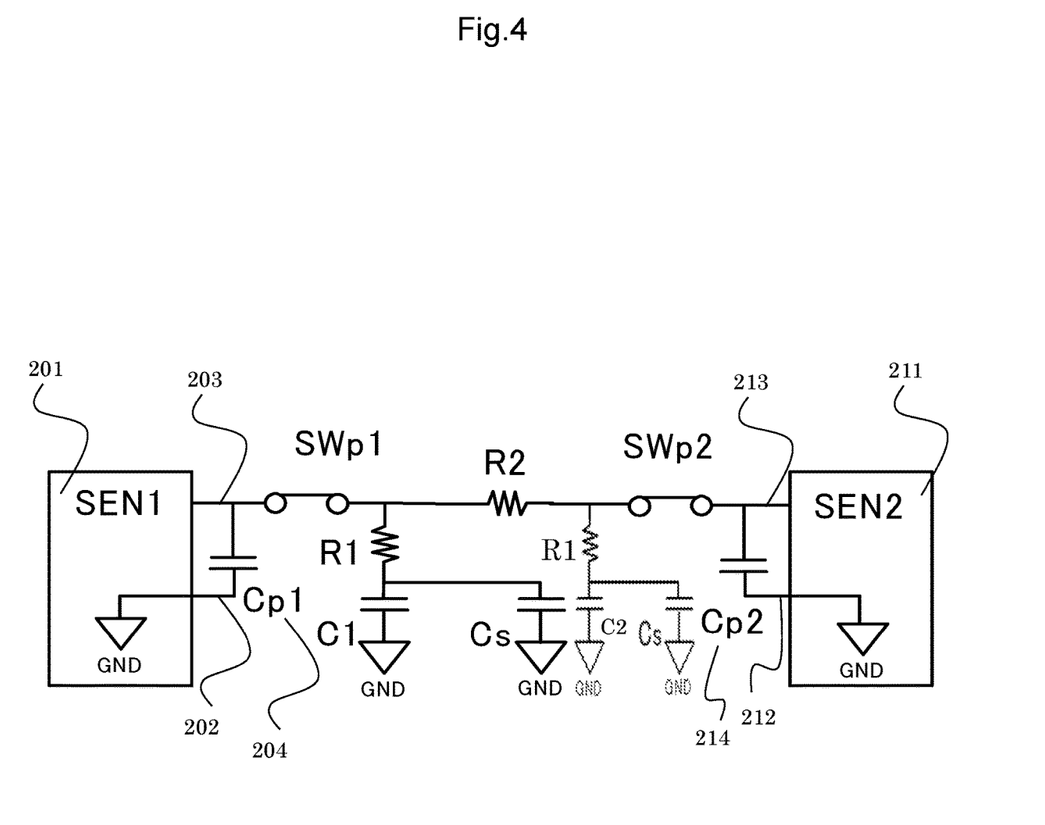
FIG. 4 is a view illustrating an electrically equivalent circuit of the configuration of FIG. 3.

In particular, when sucking the reagent between different reagent bottles, the distilled water is poor in cleaning efficiency, and there is a concern that the reliability of the analysis result may be impaired by carrying over the previously sucked reagent to the present suction. In this case, the cleaning efficiency is improved by bringing dedicated cleaning liquid into contact with the leading ends of the first reagent probe 204 and the second reagent probe 214 that have sucked the reagent. The detailed configuration of the cleaning tank 110 will be described with reference to FIGS. 3 and 4. FIG. 3 is a schematic view illustrating the configuration of the member related to the cleaning tank 110, and FIG. 4 is a view illustrating an electrically equivalent circuit of the configuration of FIG. 3.

First, the configuration of determining whether liquid comes into contact with the leading end of the first reagent probe 204 or the second reagent probe 214 will be described.

Meanwhile, FIG. 3 shows the section of the first reagent probe 204 or the second reagent probe 214.

In FIG. 3, the first reagent probe 204 is a pipe capable of containing liquid therein, and is made of a conductive member such as SUS. The first liquid-surface contact determination unit 201 is equipped with a capacitance sensor to detect a change in capacitance between a wiring 202 connected to a device GND potential and a wiring 203, and detects a change in capacitance between the leading end 207 of the first reagent probe 204 and the housing 243 to determine the liquid contact between the cleaning liquid 208 and the leading end 207 of the first reagent probe 204.

In the first liquid-surface contact determination unit 201, it is possible to detect a change in capacitance between the wiring 202 and the housing 243 having the same GND potential as the wiring 202 by connecting the wiring 203 to the first reagent probe 204.

When the leading end 207 of the first reagent probe 204 comes into contact with the cleaning liquid 208 that is conductive liquid (i.e. when an equivalent circuit switch SWp1 in FIG. 4 is closed), the volume resistance (R1 in FIG. 4) of the conductive liquid passes, so that the change by the amount of the capacitance (C1 in FIG. 4) between a surface of the container containing the conductive liquid and the housing occurs. The capacitance between the surface of the container containing the conductive liquid and the housing is several pF. However, by detecting that the capacitance equal to or higher than a prescribed threshold of 1 pF, for example, has increased, it may be determined whether the conductive cleaning liquid 208 is in contact with the leading end 207 of the first reagent probe 204.

In the above description, although the conductive liquid is used as the cleaning liquid 208 for cleaning the leading end 207 of the first reagent probe 204, the liquid is preferable as long as it is conductive. It is possible to use an analysis reagent used for the reaction in the above-described reagent bottle 112 or the like, or the sample 102 in which a plurality of sample probes 101 is used as the dispensing probe as the conductive liquid.

Here, since the first reagent probe 204 dispenses a very small amount of reagent, the inner diameter of the pipe is as thin as 1 mm or less. In that case, in order to contain the liquid volume of about 100 μl in the pipe, for example, it is necessary to secure a pipe length of 10 cm or more. If the surface of the first reagent probe 204 is exposed, a change in capacitance with the peripheral structure of the housing becomes unstable when reagent is sucked along with the movement of the first reagent probe 204. Therefore, parts other than the leading end 207 of the first reagent probe 204 coming into contact with the cleaning liquid 208 are shielded by a conductor 206 set at the GND potential via a dielectric 205 to stabilize the capacitance. When the first reagent probe 204 is not in contact with the liquid, the capacitance (Cp1 in FIG. 4) of the first reagent probe 204 is stabilized at about several tens of pF.

A cleaning-liquid supply port for storing the cleaning liquid 208 to bring the cleaning liquid 208 into contact with the leading end 207 of the first reagent probe 204 includes partition walls 209, 210, 221 and 223 made of a conductive material, a waste liquid pipe 228, and a pipe 229.

An upper passage of the cleaning-liquid supply port to which the leading end 207 of the first reagent probe 204 accessed holds the cleaning liquid 208 by the partition wall 209 and the partition wall 210. Any shape may be used as long as it has a passage to allow the cleaning liquid 208 to come into contact with the adjacent leading end 207 of the first reagent probe 204 by moving from an upper position to a lower position. The partition wall 209 and the partition wall 210 may be a part constituting the same cylinder.

The cleaning-liquid supply port is configured so that a flow path is connected to the cleaning-liquid supply port by the pipe 229, as illustrated in FIG. 3, in order to continuously supply the cleaning liquid 208. For the cleaning liquid 208, a required amount of cleaning liquid 239 is fed from the cleaning liquid bottle 238 containing the cleaning liquid 239 through the pipe 237 to a syringe inside 234 by pulling a syringe 235 with an opening/closing valve 236 opened and an opening/closing valve 232 closed. Next, the cleaning liquid 239 may be supplied as the cleaning liquid 208 through the pipe 231 and the pipe 229 to the cleaning-liquid supply port by pushing the syringe 235 with the opening/closing valve 236 closed and the opening/closing valve 232 opened. A cleaning-liquid supply unit is constituted by the pipe 231, the opening/closing valve 232, the syringe 235, the opening/closing valve 236, the pipe 237, and the cleaning liquid bottle 238.

As illustrated in FIG. 3, in the automated analyzer 100, the first reagent probe 204 as well as the two second reagent probes 214 may be cleaned by coming into contact with the cleaning liquid 218 of the cleaning-liquid supply port, in order to improve dispensing performance. This case will be described. First, the second reagent probe 214 and related configurations will be described. Although the configuration having two reagent probes has been described, a configuration having two or more reagent probes is possible. However, there is no difference in structure or operation between both the configurations.

As illustrated in FIG. 3, the second reagent probe 214 is a pipe capable of containing liquid therein, and is made of a conductive member such as SUS. The second liquid-surface contact determination unit 211 is equipped with a capacitance sensor to detect a change in capacitance between a wiring 212 connected to a device GND potential and a wiring 213, and detects a change in capacitance between the leading end 217 of the second reagent probe 214, in each of the plurality of dispensing probes, and the housing 243 to determine the liquid contact between the cleaning liquid 218 and the leading end 217 of the second reagent probe 214.

In the second liquid-surface contact determination unit 211, it is possible to detect a change in capacitance between the wiring 212 and the housing 243 having the same potential as the wiring 212 and set at the GND potential, by connecting the wiring 213 to the second reagent probe 214. Parts other than the leading end 217 of the second reagent probe 214 coming into contact with the cleaning liquid 218 are shielded by a conductor 216 set at the GND potential via a dielectric 215 to stabilize the capacitance. When the second reagent probe 214 is not in contact with the liquid, the capacitance (Cp2 in FIG. 4) of the second reagent probe 214 is stabilized at about several tens of pF.

The cleaning-liquid supply port of the second reagent probe 214 storing the cleaning liquid 218 so as to bring the cleaning liquid 218 into contact with the leading end 217 of the second reagent probe 214 includes partition walls 220, 219 and 223 made of a conductive material, and a pipe 230. Similarly to the pipe 229, the pipe 230 may be configured such that the cleaning liquid 239 as the cleaning liquid 218 is supplied from the syringe inside 234 through the pipe 231 to the cleaning-liquid supply port.

When the cleaning liquid 208 for the first reagent probe 204 and the cleaning liquid 218 for the second reagent probe 214 are replaced with new cleaning liquid, cleaning liquid from the partition walls 209, 210, 220 and 219 is extruded by pushing the cleaning liquid 239 from the syringe 235. For this purpose, the waste liquid pipe 228 is provided. The extruded cleaning liquid 208 or cleaning liquid 218 is wasted from the waste liquid pipe 228 through spaces 225, 226 and 227 defined by the partition walls 222 and 221 made of the conductive material.

Although the case where the cleaning-liquid supply port is formed as separate openings for the first reagent probe 204 and the second reagent probe 214 has been described, one passage is possible if the cleaning-liquid supply port of the equivalent circuit as illustrated in FIG. 4 is employed. However, in order to conserve the cleaning liquid to be brought into contact at once, it is desirable that the cleaning-liquid supply ports are formed as separate supply ports, respectively, which are openings having substantially the same size of only the circumference of the leading end 207 and the leading end 217.

Here, regardless of whether the cleaning-liquid supply port is one or plural, a case in which time when the first reagent probe 204 comes into contact with the cleaning liquid 208 is identical with time when the second reagent probe 214 comes into contact with the cleaning liquid 218 will be considered.

In the equivalent circuit of FIG. 4, the contact of the second reagent probe 214 may be expressed by switch SWp2, and is electrically connected to volume resistance R1 of the cleaning liquid 208 by volume resistance R2 of the cleaning liquid 218.

In such a state, the first liquid-surface contact determination unit 201 and the second liquid-surface contact determination unit 211 are directly connected in a circuit manner. Here, as described above, the capacitance sensor installed in the first liquid-surface contact determination unit 201 or the second liquid-surface contact determination unit 211 applies a constant voltage or current to the capacitance of a detection target, and measures the capacitance by measuring a response amount. For this reason, when each capacitance sensor is directly connected to the circuit, the other sensor may respond to the capacitance applied by one sensor, thus resulting in interference having no response. In such a state, it is impossible to precisely detect a small capacitance C1 between the partition wall 223 and the housing 243, changed as the leading end 207 comes into contact with the cleaning liquid 208, or a small capacitance C2 changed as the leading end 217 comes into contact with the cleaning liquid 218. As a result, the contact with the liquid may not be determined.

Therefore, in the cleaning tank 110 of this embodiment, as shown by the equivalent circuit of FIG. 4, a charge accumulation unit 240 (corresponding to Cs of FIG. 4) having an auxiliary capacitance with a capacitance value equal to or higher than the probe capacitance Cp1 of the first reagent probe 204 or the probe capacitance Cp2 of the second reagent probe 214 is formed between the conductive partition wall 222 electrically connected with the cleaning liquid 208 and 218 and the housing 243, via the wiring 241 and the wiring 242.

This charge accumulation unit 240 may avoid a situation where a small capacitance may not be detected due to interference. More specifically, even if each capacitance sensor is directly connected to the circuit, when the other sensor responds to the capacitance applied by one sensor, charges corresponding to the capacitance accumulated in the charge accumulation unit 240 responds preferentially. Thus, this does not affect the measurement of the small capacitance C1 between the partition wall 223 and the housing 243, changed as the leading end 207 comes into contact with the cleaning liquid 208 or the small capacitance C2 changed as the leading end 217 comes into contact with the cleaning liquid 218, so that interference does not occur.

Since the capacitance of the reagent probe is several tens of pF, it is preferable that the charge accumulation unit 240 uses a circuit element such as a ceramic capacitor or a chemical capacitor having the capacitance of several tens of pF. However, any element may be used as long as it physically secures a capacitance value. For example, it is also possible to use a structure in which conductive plates are made to face each other and a dielectric is provided therebetween.

Although a connection place of the wiring 241 is the partition wall 222 in FIG. 3, it is sufficient if it is possible to satisfy the equivalent circuit shown in FIG. 4. Therefore, it may be connected to any one of the partition wall 221, the partition wall 209, the partition wall 210, the partition wall 220, the partition wall 219, the partition wall 223, the pipe 229, and the pipe 230 that are electrically connected to the cleaning liquid.

Next, the effect of this embodiment will be described.

The automated analyzer 100 of the first embodiment of the present invention includes the charge accumulation unit 240 that is provided between the supply port made of the conductive material electrically connected with the cleaning liquid 208 and 218 and the housing 243 and has a capacitance which is equal to or more than the capacitance of the first reagent probe 204 and the second reagent probe 214.

With this configuration, the charge accumulation unit 240 makes it possible to electrically separate capacitance-type liquid-surface contact detection circuits provided on the first reagent probe 204 and the second reagent probe 214, and to accurately determine the liquid contact even when the first reagent probe 204 and the second reagent probe 214 simultaneously come into contact with the cleaning liquid. Therefore, an automated analyzer capable of quickly and highly reliably dispensing is realized.

Further, when the cleaning reagent in the reagent bottle containing the cleaning liquid for cleaning is exhausted and then the bottle is replaced with a new one, bubbles may be mixed in the pipe inside the probe by mistake. At this time, there is a concern that the cleaning liquid is not sufficiently filled in the cleaning-liquid supply port and the cleaning liquid is sucked without coming into contact with the cleaning liquid at the leading end of the probe. However, the automated analyzer of this embodiment may prevent such concern from occurring.

Second Embodiment

Figure 5:
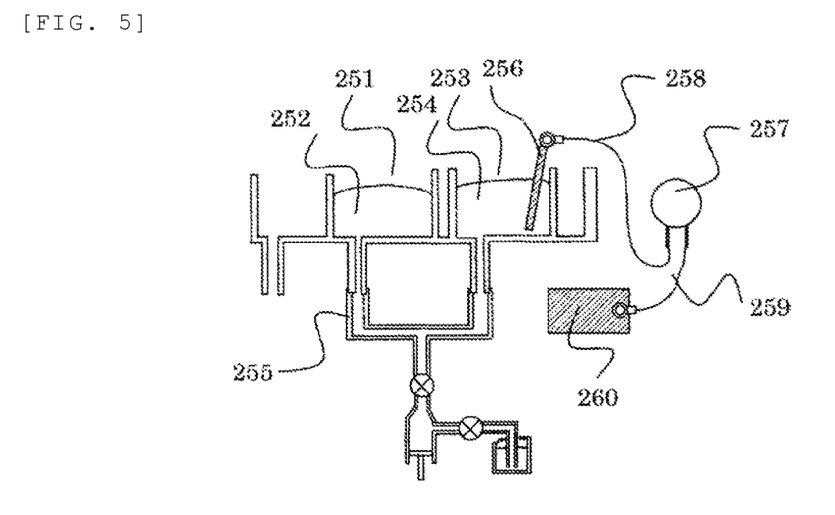
FIG. 5 is a schematic view illustrating a configuration of a member related to a cleaning tank in an automated analyzer according to a second embodiment.

An automated analyzer of a second embodiment of the present invention will be described with reference to FIG. 5. FIG. 5 is a schematic view illustrating a configuration of a member related to a cleaning tank in the automated analyzer according to this embodiment. It is to be noted that the same reference numerals are given to the same configurations as those in FIGS. 1 to 4, and the description thereof will be omitted. The same applies to the following embodiments.

In the automated analyzer of this embodiment, for the purpose of reducing cost by using a molded product of a resin material, all the partition walls constituting a supply port 251 or a supply port 253 are made of a resin or formed of a non-conductive member.

In this case, as illustrated in FIG. 5, cleaning liquid 252 and cleaning liquid 254 are electrically connected to each other through the cleaning liquid in a pipe 255. Therefore, in place of the charge accumulation unit 240, a first conductive member 256 is installed in the supply port 253 to come into contact with the cleaning liquid 254. Further, as illustrated in FIG. 5, a charge accumulation unit 257 (corresponding to Cs of FIG. 4) having an auxiliary capacitance with a capacitance value equal to or higher than the probe capacitance Cp1 or the probe capacitance Cp2 is connected between the first conductive member 256 and a housing 260, via a wiring 258 and a wiring 259.

Since other configurations and operations are substantially same as those of the automated analyzer of the above-described first embodiment, a detailed description thereof will be omitted.

The automated analyzer according to the second embodiment of the present invention further including the first conductive member 256 coming into contact with the cleaning liquid 254 and including the charge accumulation unit 257 between the first conductive member 256 and the housing 260 can achieve the effect similar to that of the automated analyzer of the above-described first embodiment, that is, it is possible to accurately determine the liquid contact even when a plurality of probes simultaneously comes into contact with the cleaning liquid.

Meanwhile, the first conductive member 256 may be installed to come into contact with the cleaning liquid 252 in the supply port 251.

Third Embodiment

Figure 6:
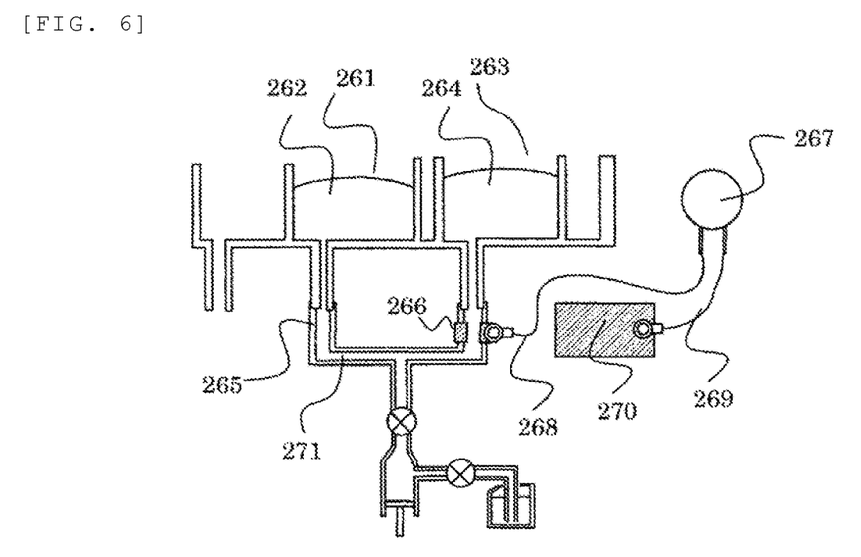
FIG. 6 is a schematic view illustrating a configuration of a member related to a cleaning tank in an automated analyzer according to a third embodiment.

An automated analyzer of a third embodiment of the present invention will be described with reference to FIG. 6. FIG. 6 is a schematic view illustrating a configuration of a member related to a cleaning tank in the automated analyzer according to this embodiment.

Similarly to the automated analyzer of the second embodiment, in the automated analyzer of this embodiment, for the purpose of reducing cost by using a molded product of a resin material, all the partition walls constituting a supply port 261 or a supply port 263 are made of a resin or formed of a non-conductive member.

In this case, as illustrated in FIG. 6, cleaning liquid 262 and cleaning liquid 264 are electrically connected to each other through cleaning liquid 271 in a pipe 265. Therefore, in place of the charge accumulation unit 240, a second conductive member 266 made of a conductive material is installed in the pipe 265 made of a non-conductive material to come into contact with the cleaning liquid 271 in the pipe 265. Further, as illustrated in FIG. 6, a charge accumulation unit 267 (corresponding to Cs of FIG. 4) having an auxiliary capacitance with a capacitance value equal to or higher than the probe capacitance Cp1 or the probe capacitance Cp2 is connected between the second conductive member 266 and the housing 270, via the wiring 268 and the wiring 269.

Since other configurations and operations are substantially same as those of the automated analyzer of the above-described first embodiment, a detailed description thereof will be omitted.

The automated analyzer according to the third embodiment of the present invention further including the second conductive member 266 provided on the pipe 265 of the cleaning-liquid supply unit to come into contact with the cleaning liquid 262 and 264 and including the charge accumulation unit 267 provided between the second conductive member 266 and the housing 270 can achieve the effect similar to that of the automated analyzer of the above-described first embodiment.

Meanwhile, the second conductive member 266 may be installed at a point where it comes into contact with the cleaning liquid 262 of the cleaning-liquid supply port 261, or a point where it comes into contact with the cleaning liquid 264 of the cleaning-liquid supply port 263. This may also obtain the same effect.

Fourth Embodiment

Figure 7:
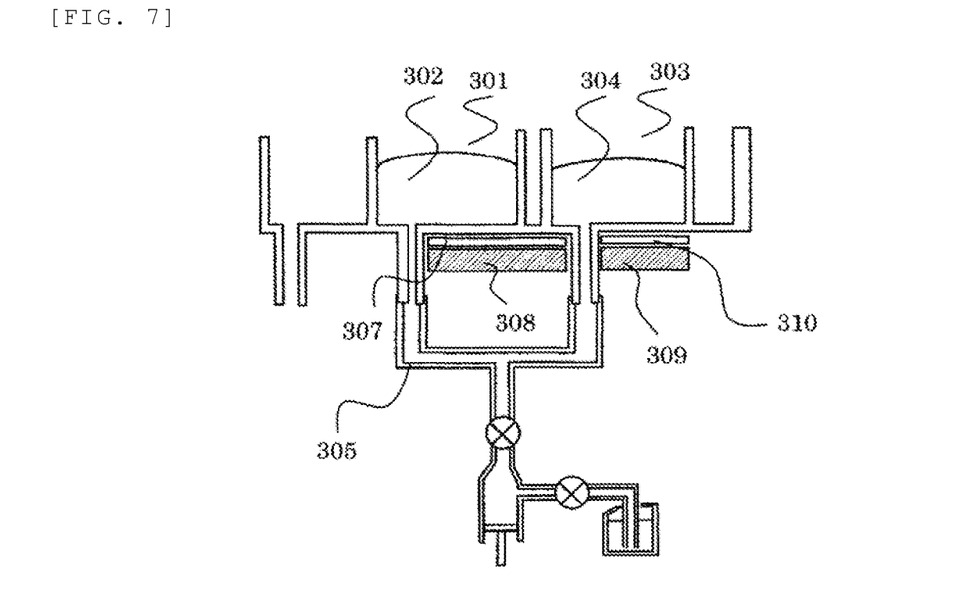
FIG. 7 is a schematic view illustrating a configuration of a member related to a cleaning tank in an automated analyzer according to a fourth embodiment.

An automated analyzer of a fourth embodiment of the present invention will be described with reference to FIG. 7. FIG. 7 is a schematic view illustrating a configuration of a member related to a cleaning tank in the automated analyzer according to this embodiment.

Similarly to the automated analyzers of the second and third embodiments, in the automated analyzer of this embodiment, for the purpose of reducing cost by using a molded product of a resin material, all the partition walls constituting the supply port 301 or a supply port 303 are made of a resin or formed of a non-conductive member.

In this case, as illustrated in FIG. 7, cleaning liquid 302 and cleaning liquid 304 are electrically connected to each other through the cleaning liquid in a pipe 305. Therefore, in place of the charge accumulation unit 240, a charge accumulation unit is provided, which includes a conductor 308 having the same potential as that of the housing provided in parallel with the supply ports 301 and 303, and a dielectric 307 provided between the conductor 308 and the supply ports 301 and 303. The charge accumulation unit is an auxiliary capacitance having a capacitance value (corresponding to Cs in FIG. 4) equal to or higher than the probe capacitance Cp1 or the probe capacitance Cp2. Any shape and material may be used for this charge accumulation unit as long as the capacitance is secured, but the dielectric 307 is used in order to ensure stable capacitance. For example, it is known that the specific inductive capacity is about 1 to 10 for a plastic film or an aluminum oxide film. However, when the dielectric (specific inductive capacity=5) having the thickness of about 0.1 mm is used as the dielectric 307 in the conductor 308 that is 20 mm in length and 40 mm in width, it is possible to obtain the charge accumulation unit having the capacitance of about 300 pF in an ideal state.

Since other configurations and operations are substantially same as those of the automated analyzer of the above-described first embodiment, a detailed description thereof will be omitted.

The automated analyzer according to the fourth embodiment of the present invention including the conductor 308 having the same potential as that of the housing provided in parallel with the supply ports 301 and 303 as the charge accumulation unit, and the dielectric 307 provided between the conductor 308 and the supply ports 301 and 303 can achieve the effect similar to that of the automated analyzer of the above-described first embodiment.

When it is desired to further increase the capacitance of the charge accumulation unit, as illustrated in FIG. 7, a dielectric 310 and an electrode 309 having the same potential as the housing may be further provided.

Fifth Embodiment

Figure 8:
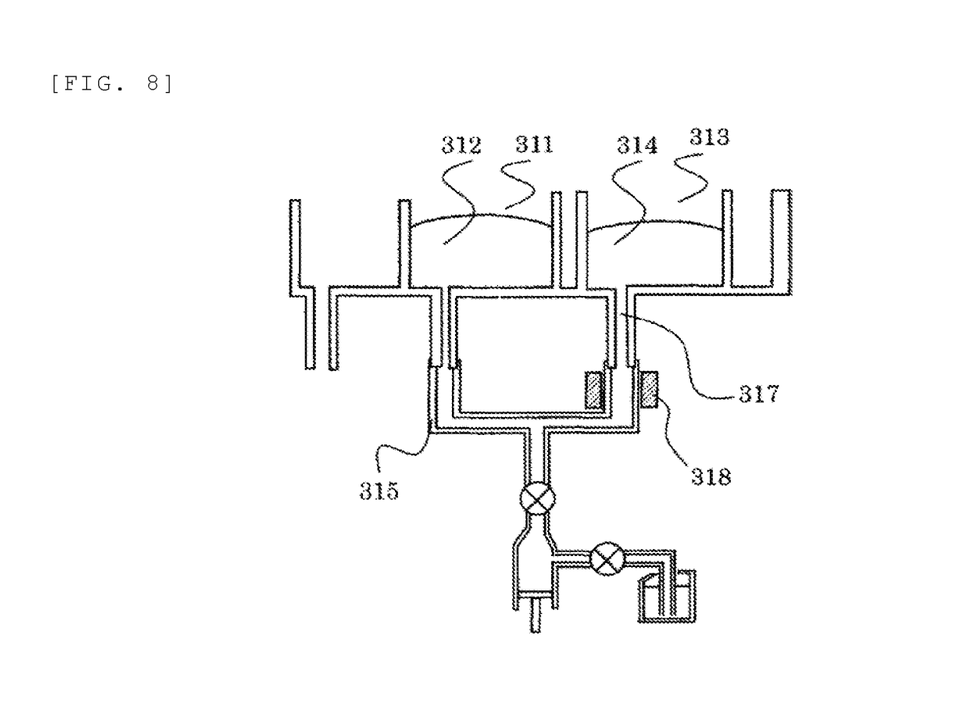
FIG. 8 is a schematic view illustrating a configuration of a member related to a cleaning tank in an automated analyzer according to a fifth embodiment.

An automated analyzer of a fifth embodiment of the present invention will be described with reference to FIG. 8. FIG. 8 is a schematic view illustrating a configuration of a member related to a cleaning tank in the automated analyzer according to this embodiment.

Similarly to the automated analyzers of the second to fourth embodiments, in the automated analyzer of this embodiment, for the purpose of reducing cost by using a molded product of a resin material, all the partition walls constituting a supply port 311 or a supply port 313 are made of a resin or formed of a non-conductive member.

In this case, as illustrated in FIG. 8, cleaning liquid 312 and cleaning liquid 314 are electrically connected to each other through cleaning liquid 317 in a non-conductive pipe 315. Therefore, in place of the charge accumulation unit 240, a charge accumulation unit is provided, which includes a conductor 318 having the same potential as that of the housing provided in parallel with the non-conductive pipe 315, and causes the non-conductive pipe 315 itself to act as a dielectric, thus having a capacitance value (corresponding to Cs in FIG. 4) equal to or higher than the probe capacitance Cp1 or the probe capacitance Cp2, between the conductor 318 with the same potential as the housing and apart of the cleaning liquid 317 in the non-conductive pipe 315.

Since other configurations and operations are substantially same as those of the automated analyzer of the above-described first embodiment, a detailed description thereof will be omitted.

The automated analyzer according to the fifth embodiment of the present invention in which the cleaning-liquid supply unit is made of the non-conductive pipe 315 and the charge accumulation unit includes the non-conductive pipe 315 and the conductor 318 having the same potential as the housing provided in parallel with the non-conductive pipe 315 can achieve the effect similar to that of the automated analyzer of the above-described first embodiment.

Others

It should be noted that the present invention is not limited to the above-described embodiments, but includes various modifications. The above embodiments have been described in detail in order to facilitate the understanding of the invention, and are not necessarily limited to those having all the configurations described. Further, it is possible to replace a part of the configuration of one embodiment with the configuration of another embodiment, and to combine the configuration of one embodiment with the configuration of another embodiment. Further, the addition, removal, or substitution of components may be made for the configuration of each embodiment.

REFERENCE SIGNS LIST

100: automated analyzer
101: sample probe
102: sample
103: reaction disk
104: reaction container
105: x-moving-mechanism holding part
106: first x-direction moving mechanism
107: second x-direction moving mechanism
108: reagent disk
109: detector
110: cleaning tank
112: reagent bottle
113: first reagent bottle
114: second reagent bottle
115: third reagent bottle
116: fourth reagent bottle
121: first z-direction moving mechanism
122: first-reagent-probe holding part
126: second z-direction moving mechanism
128: second-reagent-probe holding part
130: controller
201: first liquid-surface contact determination unit 202,203,212,213: wiring
204: first reagent probe
205,215: dielectric
206,216: conductor
207,217: leading end
208,218,234,239,252,254,262,264,271,302,304,312,314, 317: cleaning liquid
209,210,219,220,221,222,223: partition wall
211: second liquid-surface contact determination unit
214: second reagent probe
225,226,227: space
228: waste liquid pipe
229,230,231,237: pipe
232,236: opening/closing valve
235: syringe
238: cleaning liquid bottle
240,257,267: charge accumulation unit
241,242,258,259,268,269: wiring
243,260,270: housing
251,253,261,263,301,303,311,313: supply port
255,265,305: pipe
256: first conductive member
266: second conductive member
307,310: dielectric
308,318: conductor
309: electrode
315: non-conductive pipe

The invention claimed is:

1. An automated analyzer dispensing and causing a sample and a reagent to react with each other in a reaction container to measure a reacted mixed solution, the automated analyzer comprising:
   a plurality of dispensing probes, including reagent probes and sample probes, each of which is configured to dispense a reagent or a sample to be analyzed, respectively, into the reaction container,
   a supply port storing conductive liquid with which the reagent probes come into contact,
   a conductive-liquid supply unit supplying the conductive liquid, through a flow path connected to the supply port, to the supply port,
   a liquid-surface contact determination unit, including a capacitance sensor, installed in each of the plurality of dispensing probes, and determining a contact of a leading end of each of the plurality of dispensing probes with a liquid surface of the conductive liquid, based on a change in capacitance between the leading end and a housing, and
   a charge accumulation unit, including a capacitor, provided between the conductive liquid and the housing, and having a capacitance that is equal to or higher than a capacitance of each of the plurality of dispensing probes.

2. The automated analyzer of claim 1, wherein
   the supply port is made of a conductive material, and
   the charge accumulation unit is provided between the supply port electrically connected to the conductive liquid and the housing.

3. The automated analyzer of claim 1, further comprising:
   a first conductive member coming into contact with the conductive liquid, wherein
   the charge accumulation unit is provided between the first conductive member and the housing.

4. The automated analyzer of claim 1, further comprising:
   a second conductive member provided on the supply port or the conductive-liquid supply unit to come into contact with the conductive liquid, wherein
   the charge accumulation unit is provided between the second conductive member and the housing.

5. The automated analyzer of claim 1, wherein
   the charge accumulation unit includes a conductor having the same potential as that of the housing provided parallel with the supply port, and
   a dielectric provided between the conductor and the supply port.

6. The automated analyzer of claim 1, wherein
   the conductive-liquid supply unit is formed of a non-conductive member, and
   the charge accumulation unit includes a conductor having the same potential as that of the housing provided parallel with the conductive-liquid supply unit.

* * * * *